(12) United States Patent
Hao et al.

(10) Patent No.: US 9,386,332 B2
(45) Date of Patent: Jul. 5, 2016

(54) MULTI-SCREEN VIDEO

(75) Inventors: Jack Jianxiu Hao, Lexington, MA (US); Zhiying Jin, Lexington, MA (US); Martin A. Busse, Woburn, MA (US); Wei Xia, Sudbury, MA (US); John F. Gallagher, Hopewell, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 351 days.

(21) Appl. No.: 13/310,844

(22) Filed: Dec. 5, 2011

(65) Prior Publication Data

US 2013/0145383 A1  Jun. 6, 2013

(51) Int. Cl.
| | |
|---|---|
| H04N 7/173 | (2011.01) |
| H04N 21/239 | (2011.01) |
| H04N 21/2665 | (2011.01) |
| H04N 21/278 | (2011.01) |
| H04N 21/472 | (2011.01) |
| G06F 17/30 | (2006.01) |
| H04N 5/445 | (2011.01) |

(52) U.S. Cl.
CPC ...... *H04N 21/2393* (2013.01); *G06F 17/30784* (2013.01); *H04N 21/2665* (2013.01); *H04N 21/278* (2013.01); *H04N 21/47202* (2013.01)

(58) Field of Classification Search
CPC .......... H04N 21/278; H04N 21/47202; H04N 5/4453; H04N 21/222; H04N 21/2225; H04N 21/2543; H04N 21/2547; H04N 21/2223; H04N 21/225; H04N 21/231; H04N 21/23116; H04N 21/237; H04N 21/25; H04N 21/254; H04N 21/2541; H04N 21/2542; H04N 21/25816; H04N 21/25875; H04N 21/25225; H04N 21/4431; H04N 21/4432; H04N 21/472; H04N 21/47208; H04N 21/47211; H04N 21/4784; H04N 21/6334; H04N 21/63345; H04N 21/65; H04N 21/26225; H04N 21/4622; G06F 17/30784; G06F 17/30017
USPC .................. 725/60, 61, 39, 23, 91, 87, 28, 30
See application file for complete search history.

(56) References Cited

U.S. PATENT DOCUMENTS

| | | | | | |
|---|---|---|---|---|---|
| 5,758,257 | A | * | 5/1998 | Herz et al. ..................... | 725/116 |
| 6,057,872 | A | * | 5/2000 | Candelore ....................... | 725/23 |
| 7,346,556 | B2 | * | 3/2008 | Upendran et al. .......... | 705/26.41 |
| 7,644,173 | B1 | * | 1/2010 | Zhang ............................ | 709/231 |
| 7,933,970 | B2 | * | 4/2011 | Zimler ................ | H04L 12/2814 709/203 |
| 8,122,477 | B1 | * | 2/2012 | Stepanian ....................... | 725/91 |
| 8,607,269 | B2 | * | 12/2013 | Needham et al. ............... | 725/39 |
| 8,615,157 | B1 | * | 12/2013 | Isaacson et al. .............. | 386/241 |

(Continued)

*Primary Examiner* — Pankaj Kumar
*Assistant Examiner* — Reuben M Brown

(57) ABSTRACT

One or more network devices receive, from a third-party system, catalog metadata for physical media assets available to order and combine the catalog metadata with catalog entries for digital content to form a unified catalog file. The one or more devices receive, from a user device, a request to view a directory of available video content and send, to the user device, the unified catalog file for presentation to a user. The one or more devices receive, from the user device, a selection of an item in the unified catalog file. The one or more devices provide, to the user device, video content corresponding to the selection when the selection corresponds to one of the catalog entries for digital content and provide, to the third-party system and via a billing gateway, user payment information when the selection corresponds to the catalog metadata for one of the physical media assets.

20 Claims, 14 Drawing Sheets

(56) References Cited

U.S. PATENT DOCUMENTS

| | | | |
|---|---|---|---|
| 8,934,865 B2* | 1/2015 | Nandagopal | G06Q 20/32 370/310.2 |
| 9,032,437 B2* | 5/2015 | LaFreniere et al. | 725/39 |
| 2002/0108114 A1* | 8/2002 | Shinohara et al. | 725/46 |
| 2004/0199430 A1* | 10/2004 | Hsieh | G06Q 30/02 705/26.62 |
| 2005/0204398 A1* | 9/2005 | Ryal | G11B 27/034 725/112 |
| 2007/0124771 A1* | 5/2007 | Shvadron | 725/61 |
| 2007/0294726 A1* | 12/2007 | Drazin | 725/39 |
| 2008/0162156 A1* | 7/2008 | Fein | G06F 17/30058 705/1.1 |
| 2008/0168139 A1* | 7/2008 | Junuzovic | H04L 67/1095 709/205 |
| 2008/0307463 A1* | 12/2008 | Beetcher et al. | 725/53 |
| 2009/0178093 A1* | 7/2009 | Mitsuji et al. | 725/104 |
| 2010/0030808 A1* | 2/2010 | Ress et al. | 707/104.1 |
| 2010/0057836 A1* | 3/2010 | Anbuselvan | G06F 8/70 709/203 |
| 2010/0063878 A1* | 3/2010 | Bachet | G06Q 30/0251 705/14.49 |
| 2010/0138791 A1* | 6/2010 | Anglin, Jr. | H04N 7/17318 715/835 |
| 2010/0205243 A1* | 8/2010 | Brady | H04L 9/3213 709/203 |
| 2011/0145111 A1* | 6/2011 | Ljunggren | G06Q 20/10 705/30 |
| 2012/0137315 A1* | 5/2012 | Christopher et al. | 725/5 |
| 2012/0192234 A1* | 7/2012 | Britt | H04N 5/782 725/58 |
| 2012/0210340 A1* | 8/2012 | Reynolds | H04N 21/2543 725/23 |
| 2013/0145383 A1* | 6/2013 | Hao et al. | 725/1 |
| 2013/0166920 A1* | 6/2013 | Cousins | G06F 12/1408 713/189 |
| 2015/0026722 A1* | 1/2015 | Koplar | 725/37 |

* cited by examiner

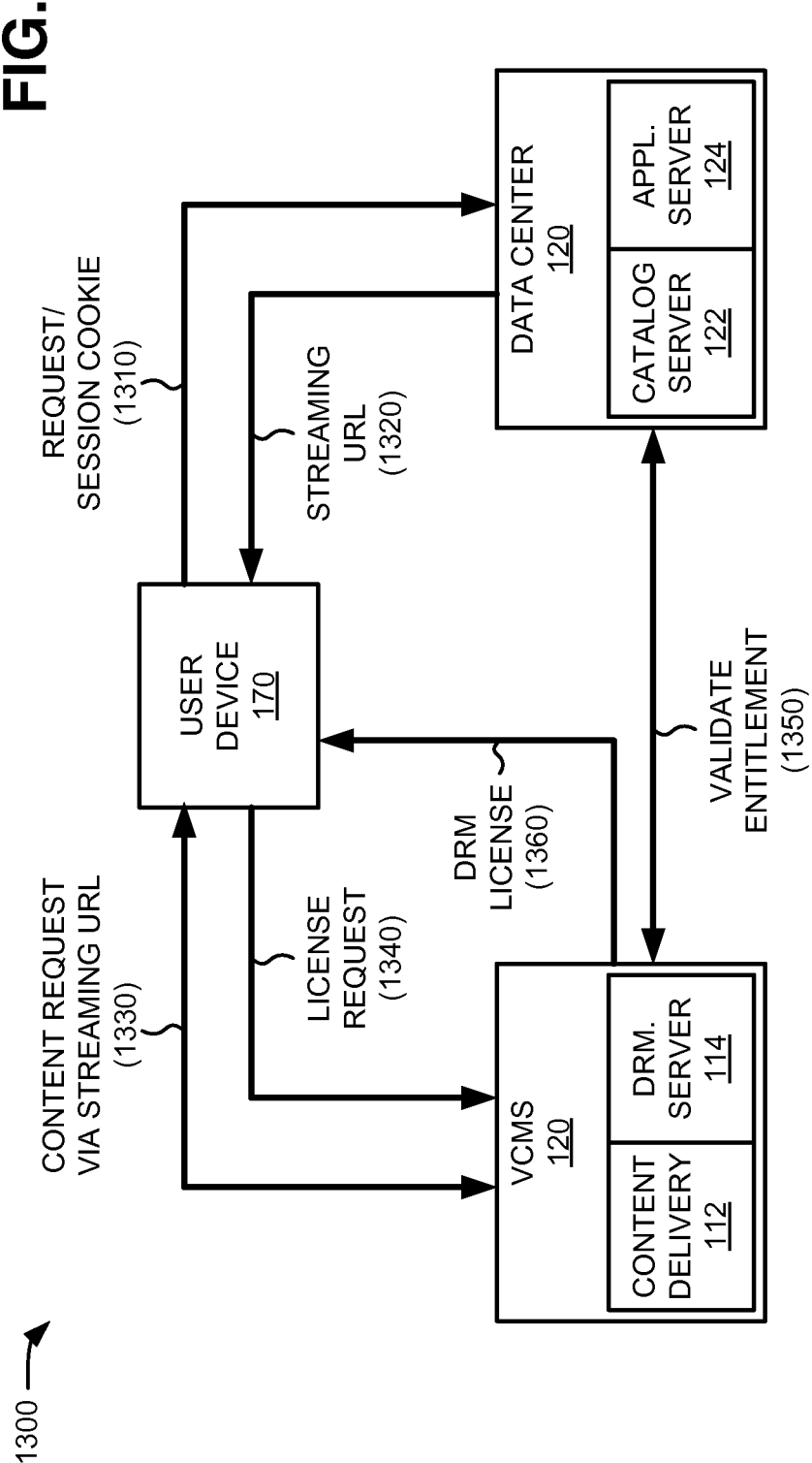

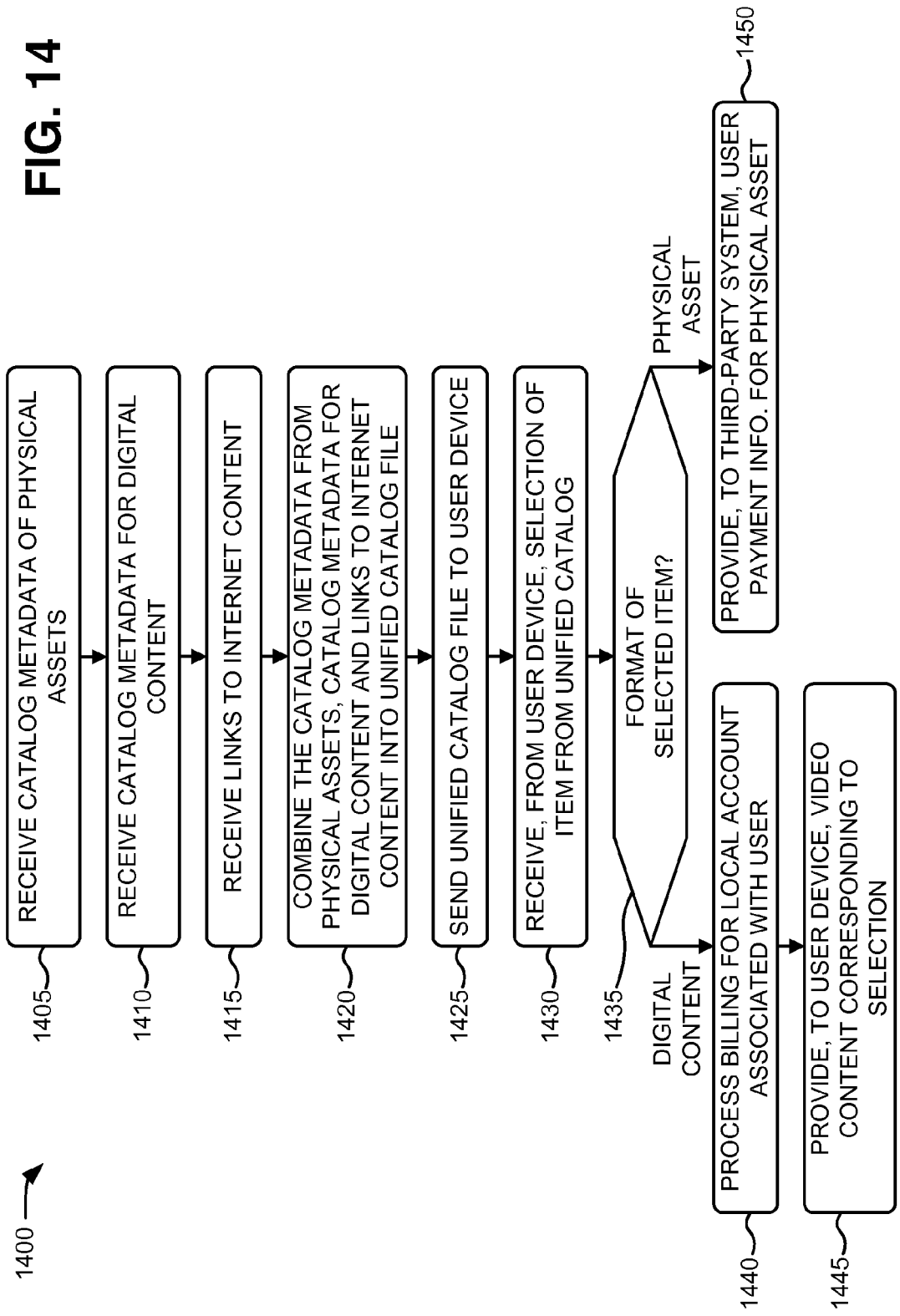

US 9,386,332 B2

MULTI-SCREEN VIDEO

BACKGROUND

Multi-screen video architecture generally provides cross-platform access to a single content source. Among other benefits, multi-screen video provides consumers the possibility to watch video on a screen/device of their choice. For example, a live broadcast television event may also be available for viewing on various types of mobile devices.

BRIEF DESCRIPTION OF THE DRAWINGS

FIG. 13 is a diagram of exemplary communications for a further portion of network 100; and FIG. 14 is a flow chart of an exemplary process for providing access to multi-screen video and physical asset orders according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a unified interface to distribute digital content (such as online streaming, downloads, or other content that is not constrained to distribution via a particular hardware) to user devices and to arrange for distribution of physical content (such as DVDs, Blu-ray discs, memory cards, etc.) to users of user devices. The systems and/or methods may also permit a wide range of user activities that may be integrated among multiple devices that are associated, for example, with a single user account.

In one implementation, the systems and/or methods may receive, from a third-party system, catalog metadata for physical media assets available to order and may combine the catalog metadata with catalog entries for digital content to form a unified catalog file. The systems and/or methods may receive, from a user device, a request to view a directory of available video content and may send, to the user device, the unified catalog file for presentation to a user. The systems and/or methods may receive, from the user device, a selection of an item in the unified catalog file. The systems and/or methods may provide, to the user device, video content corresponding to the selection when the selection corresponds to one of the catalog entries for digital content and may provide, to the third-party system and via a billing gateway, user payment information when the selection corresponds to the catalog metadata for one of the physical media assets.

Figure 1:
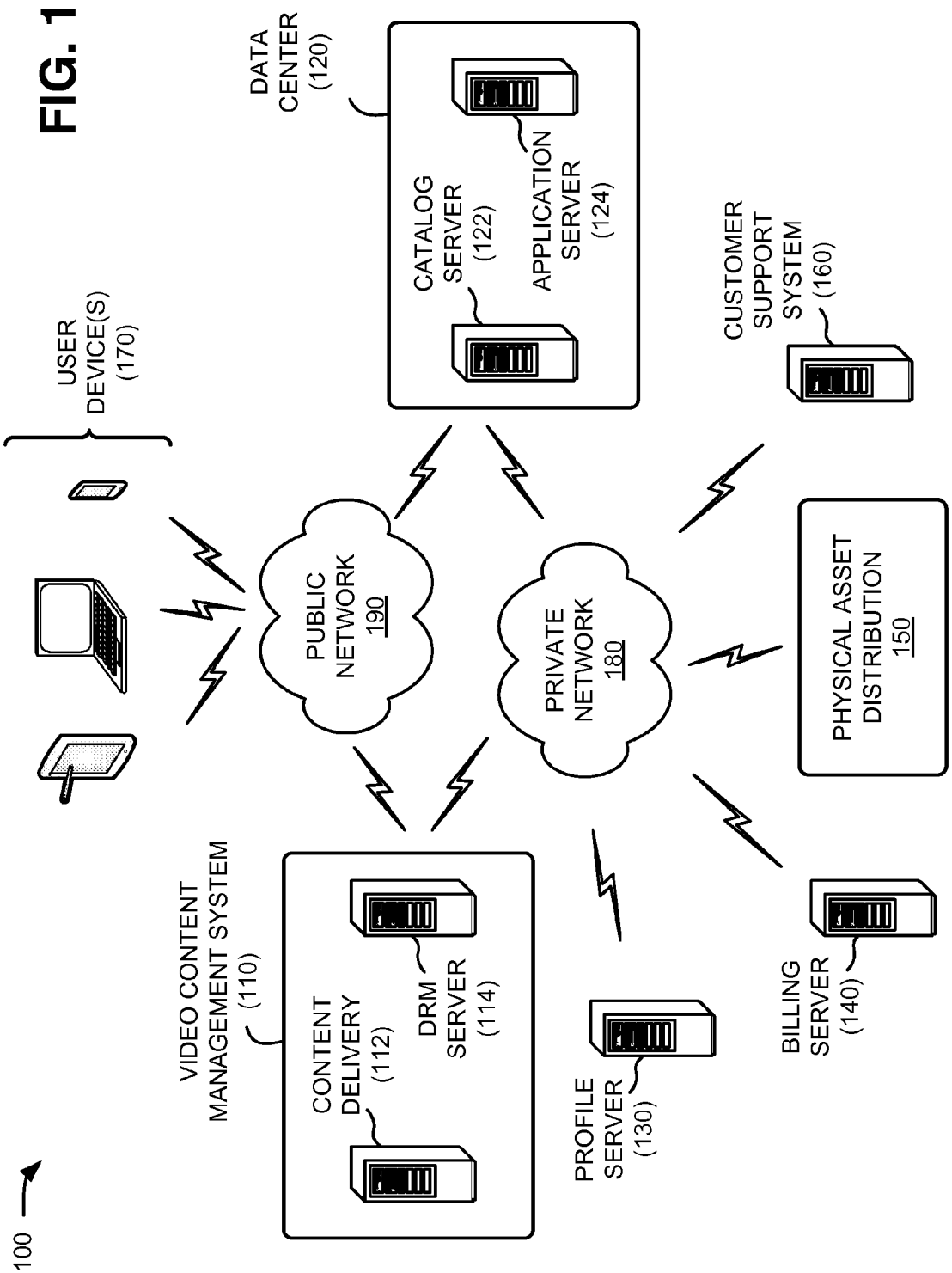
FIG. 1 is an exemplary network in which systems and/or methods described herein may be implemented.

FIG. 1 is an exemplary network 100 in which systems and/or methods described herein may be implemented. As illustrated, network 100 may include a video content management system (VCMS) 110, a data center 120, a profile server 130, a billing server 140, a physical asset distribution system 150, a customer support system 160, user devices 170, a private network 180, and a public network 190. The particular arrangement and number of components of network 100 shown in FIG. 1 are illustrated for simplicity. In practice there may be more VCMSs 110, data centers 120, profile servers 130, billing servers 140, physical asset distribution systems 150, customer support systems 160, user devices 170, and/or networks 180/190. Components of network 100 may be connected via wired and/or wireless links.

VCMS 110 may include one or more network devices, or other types of computation or communication devices, to aggregate content and content metadata, process content, and distribute content. In one implementation, VCMS 110 may include a content delivery system 112 and a digital rights management (DRM) server 114. VCMS 110 may aggregate content and transcode content into a digital format suitable for consumption on particular user devices 170. For example, VCMS 110 may include a transcoding device to convert a video file from one format to another (e.g., from one bit rate to another bit rate, from one resolution to another, from one standard to another, from one file size to another, etc). VCMS 110 may also encrypt data and communicate with DRM server 114 to enforce digital rights.

Content delivery system 112 may include one or more network devices, or other types of computation or communication devices, to deliver digital content from a backend server to user devices 170. In one implementation, content delivery system 112 may include a streaming server that provides streaming data packets (e.g., via a streaming URL) to user devices 170 (e.g., via network 180). In one implementation, a streaming URL may be session-based, such that each URL can be used only once for one user device 170 for security purposes.

DRM server 114 may include one or more network devices, or other types of computation or communication devices, to issue, validate, and/or enforce DRM licenses to a client, such as an application running on one of user devices 170. In implementations herein, DRM server 114 may communicate with user device 170 to authenticate a user of user device 170, the particular user device 170, and/or an application residing on user device 170. For example, DRM server 114 may request/receive login information associated with the user, and compare the login information with stored information to authenticate the user. Additionally, or alternatively, DRM server 114 may request/receive device information (e.g., a unique device identifier) associated with user device 170, and may compare the device information with stored information to authenticate user device 170.

Data center 120 may include one or more network devices, or other types of computation or communication devices, to manage the authorization, selection, and/or purchase of multimedia content by a user of user devices 170. As shown in FIG. 1, data center 120 may include a catalog server 122 and an application server 124. In one implementation, data center 120 may be accessed by user devices 170 via public network 190.

Catalog server 122 may include one or more network devices, or other types of computation or communication devices, to provide a unified catalog of both digital and physical content for users (e.g., of user devices 170) to consume (e.g., buy, rent, or subscribe). In one implementation, catalog server 122 may collect and/or present listings of content available to user devices 170. For example, catalog server 122 may receive digital and/or physical content metadata, such as lists or categories of content, from VCMS 110 and/or physical asset distribution system 150. Catalog server 122 may use the content metadata to provide currently-available content options to user devices 170. Catalog server 122 may provide the content metadata to user device 170 directly or may communicate with user device 170 via application server 124.

Application server 124 may include one or more network devices, or other types of computation or communication devices (e.g., a server device, an application server device, a Web server device, a database server device, a computer, etc.), to provide a backend support system for mobile applications residing on user devices 170. For example, application server 124 may permit user device 170 to download a video application that may permit a user to find content of interest or play downloaded or streaming content. The video application may enable user device 170 to present to a user of user device 170 information received from data center 120 in an interactive format to allow selection of particular digital or physical content. Additionally, or alternatively, application server 124 may provide content metadata, such as lists or categories of content. Also, application server 124 may authenticate a user who desires to purchase, rent, or subscribe to digital or physical content. In one implementation, the interactions between application server 124 and user device 170 may be performed using hypertext transfer protocol (HTTP) or secure HTTP (HTTPS) via public network 190.

Profile server 130 may include one or more network devices, or other types of computation or communication devices, to store user profile information for users (e.g., users of user devices 170). The user profile information may include various information regarding a user, such as login information (e.g., a user identifier and a password), billing information, address information, types of services to which the user has subscribed, a list of digital/physical content purchased by the user, a list of video content rented by the user, a list of video content to which the user has subscribed, a user device identifier (e.g., a media player identifier, a mobile device identifier, a set top box identifier, a personal computer identifier) for user device 170, a video application identifier associated with the video application obtained from application server 124, or the like. Application server 124 may use the user profile information from profile server 130 to authenticate a user and may update the user profile information based on the user's activity (e.g., with a user's express permission).

Billing server 140 may include one or more network devices, or other types of computation or communication devices, to manage charging users for services provided via network 100. Billing server 140 may include, for example, a payment processing component, a billing component, and/or a settlement component.

Physical asset distribution system 150 may include one or more network devices, or other types of computation or communication devices, to track availability of physical content (e.g., DVDs, Blu-ray discs, memory cards, etc.) and provide metadata of physical content for inclusion in catalog information provided to users of user devices 170. In one implementation, physical asset distribution system 150 may also provide physical assets information, such as location information, so that when a user wants to buy a physical asset, the system can direct the user to the nearest geographic location (e.g., to retrieve the physical asset). Additionally, or alternatively, physical asset distribution system 150 may generate or receive credit information for users (e.g., for cross-promotion purposes). For example, after a user of user device 170 has purchased a digital asset or subscription/rental, the user may be entitled some credits for getting physical asset or vice versa. In implementations described herein, physical asset distribution system 150 may be controlled by a different entity (e.g., a third-party provider) than the entity controlling VCMS 110, datacenter 120, and/or other components of network 100.

Customer support system 160 may include one or more network devices, or other types of computation or communication devices, to solicit and/or receive user feedback, questions, or credit-related requests. In one implementation customer support system 160 may include interfaces with data center 120 and/or billing server 140, for example, to receive problem reports and to resolve customer billing disputes.

User device 170 may include a computation or communication device to enable a user to view video content or interact with another user device 170 or a video display device (e.g., a set-top box and/or television). User device 170 may include, for example, a personal communications system (PCS) terminal (e.g., a smartphone that may combine a cellular radiotelephone with data processing and data communications capabilities), a tablet computer, a smartphone, a personal computer, a laptop computer, a gaming console, an Internet television, or other types of computation or communication devices. In one implementation, user device 170 may include a client-side application that enables user device 170 to communicate with, for example, data center 120 and/or present information received from data center 120 to a user. The client-side application may permit a user of user device 170 to log into an account (e.g., via application server 124), access catalog information (e.g., from catalog server 122), submit an order, and/or consume live streaming video content (e.g., from VCMS 110).

Private network 180 may include, for example, one or more private IP networks that use a private IP address space. Private network 180 may include a local area network (LAN), an intranet, a private wide area network (WAN), etc. In one implementation, private network 180 may implement one or more Virtual Private Networks (VPNs) for providing communication between, for example, any of VCMS 110, data center 120, profile server 130, billing server 140, physical asset distribution system 150, and/or customer support system 160. Private network 180 may be protected/separated from other networks, such as public network 190, by a firewall. Although shown as a single element in FIG. 1, private network 180 may include a number of separate networks.

Public network 190 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, public network 190 may include a number of separate networks that provide services to user devices 170.

Figure 2:
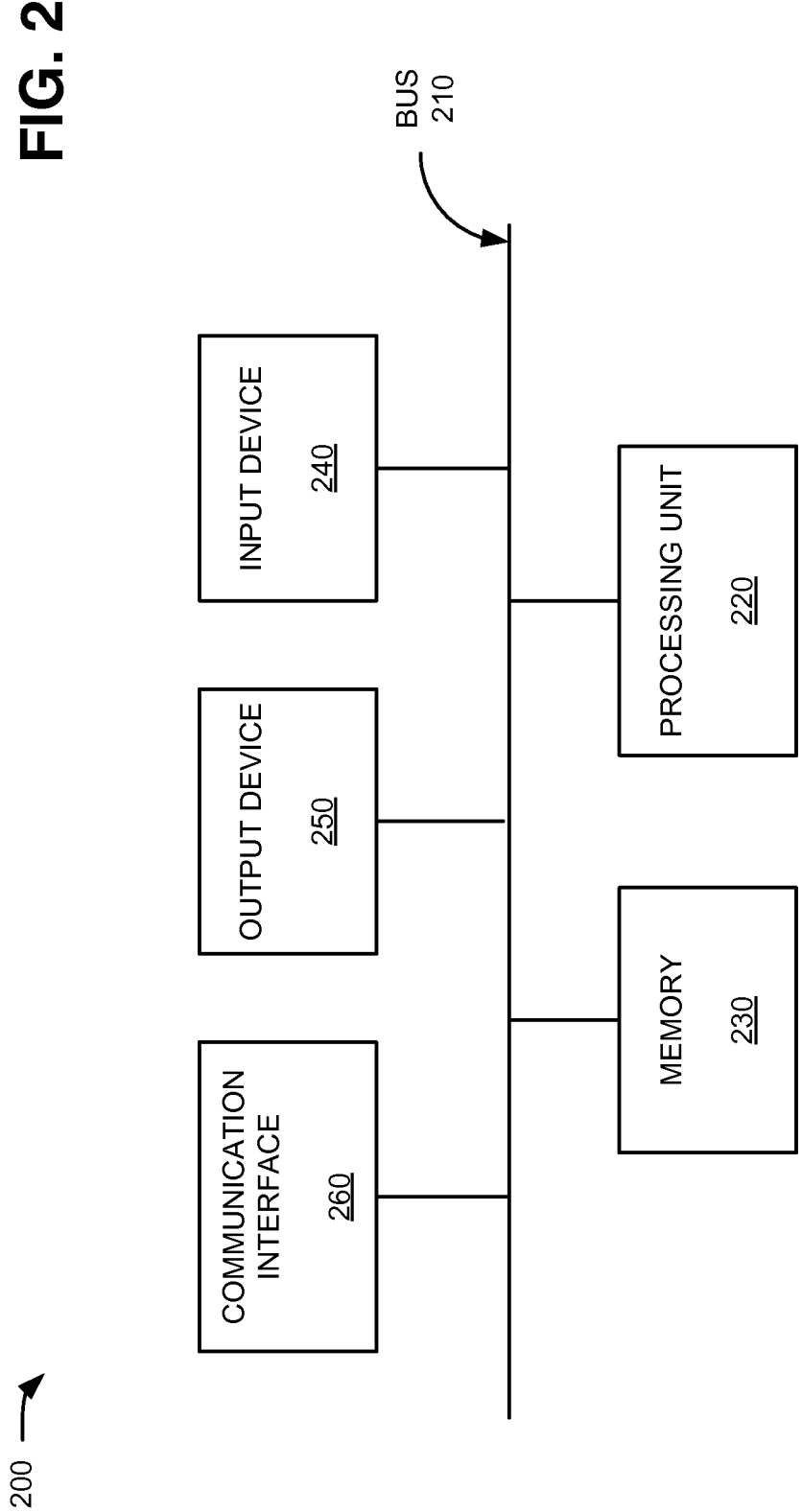
FIG. 2 is a block diagram of exemplary components of a device that may correspond to one of the devices of FIG. 1.

FIG. 2 is a diagram of exemplary components of a device 200 that may correspond to VCMS 110, content delivery system 112, DRM server 114, data center 120, catalog server 122, application server 124, profile server 130, billing server 140, physical asset distribution system 150, customer support system 160, or user device 170. Each of VCMS 110, content delivery system 112, DRM server 114, data center 120, catalog server 122, application server 124, profile server 130, billing server 140, physical asset distribution system 150, customer support system 160, and user device 170 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may include a non-transitory memory device. A memory device may include a single physical memory device or may be spread across multiple physical memory devices. The software instructions may be read into memory 230 from another computer-readable medium or from another device via communication interface 250. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
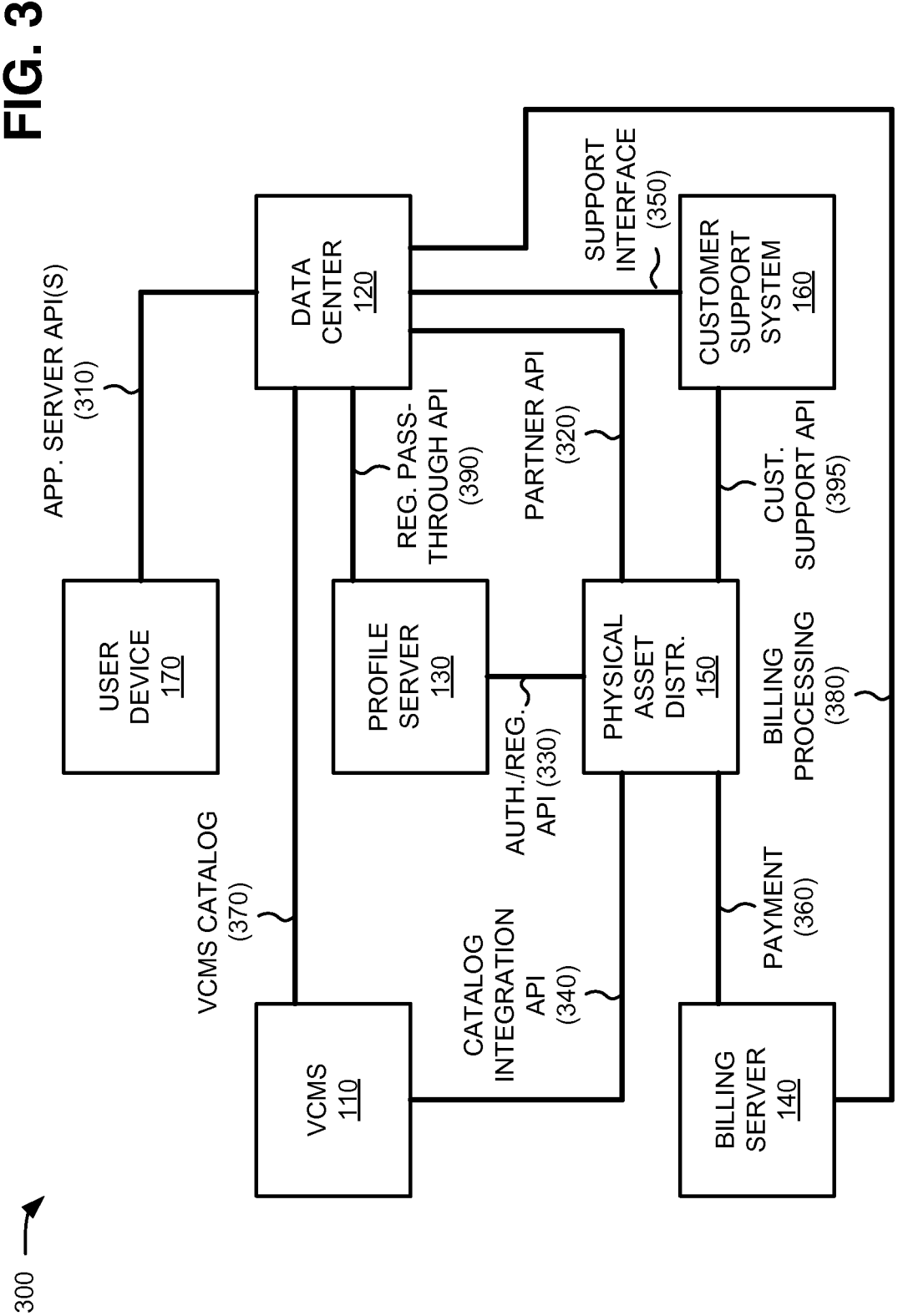
FIG. 3 is a diagram of exemplary communication interfaces within a portion of the network of FIG. 1.

FIG. 3 is a diagram of exemplary communication interfaces for a portion 300 of network 100. Communication interfaces in FIG. 3 may represent communications to support ordering of digital content and physical content by a user. As shown in FIG. 3, network portion 300 may include VCMS 110, data center 120, profile server 130, billing server 140, physical asset distribution system 150, customer support system 160, and user device 170. VCMS 110, data center 120, profile server 130, billing server 140, physical asset distribution system 150, customer support system 160, and user device 170 may include features described above in connection with, for example, FIGS. 1 and 2.

Network portion 300 may include application server application programming interfaces (APIs) 310, a partner API 320, an authentication and registration API 330, a catalog integration API 340, a support interface 350, a payment gateway API 360, a VCMS catalog API 370, a billing processing API 380, a registration pass-through API 390, and a customer support API 395. The interfaces of network portion 300 may be standard APIs, such as Web Service APIs, such that components (e.g., such as another physical asset distribution system 150, or other third-party systems) may be plugged in or exchanged into the existing architecture of network 100.

Data center 120 may provide one or more application server APIs 310 to user device 170. Data center 120 (e.g., application server 124) may provide different APIs to user device 170 depending on, for example, the type of operating system included on user device 170. For example, application server API 310 may include a web (e.g., web 2.0) API, an Android® API, an iOS API, or a Windows CE API. Application server API 310 may enable user device 170 to view, search, and/or place orders from catalogs provided by data center 120.

Data center 120 may provide partner API 320 to physical asset distribution system 150. Partner API 320 may include, for example, an interface to identify/update physical asset locations, conduct authentication and registrations in third-party systems (e.g., associated with physical asset distribution system 150), and/or exchange credit/discount information for user accounts (e.g., for cross-promotion purposes).

Profile server 130 may provide an authentication and registration API 330 to physical asset distribution system 150. Authentication and registration API 330 may permit profile server 130 to register new users with physical asset distribution system 150 or to initiate user authentication procedures for physical asset distribution system 150. In the case of new user registrations, profile server 130 may collect user information from user device 170 (e.g., via application server 124) and provide the user information to physical asset distribution system 150 to create an account in a physical asset distribution system 150 database. In the case of authentications of existing user accounts, profile server 130 may collect user login information (e.g., a login name and password) from user device 170 (e.g., via application server 124) and provide the login information to physical asset distribution system 150 for authentication. Assuming the user is authenticated by physical asset distribution system 150, profile server 130 may generate a session token with a particular expiration time and send the session token to user device 170 (e.g., via application server 124) for future validation.

Physical asset distribution system 150 may implement catalog integration API 340 to inform VCMS 110 of physical assets available to users of user devices 170. Physical asset distribution system 150 may use catalog integration API 340 to provide catalog descriptions for physical media assets and/or metadata about content on the physical assets, such as titles, formats (e.g., DVD, Blu-ray, memory card, etc.), and descriptions. In one implementation, catalog integration API 340 may support delivery of an XML metadata file to VCMS 110.

Customer support system 160 may provide a support interface 350 to data center 120. Support interface 350 may include APIs to enable communications with customer support system 160. For example, support interface 350 may provide an avenue to report customer disputes (e.g., originating from user devices 170) from data center 120 to customer support system 160.

Billing server 140 may provide payment gateway API 360 for physical asset distribution system 150. Payment gateway API 360 may provide a vehicle to apply charges (e.g., credit card payments) to a user's account in physical asset distribution system 150 for physical content ordered via data center 120. Billing server 140 may also generate internal billing entries for digital content ordered by users and delivered via VCMS 110.

VCMS 110 may include VCMS catalog API 370 to export content metadata to data center 120. For example, VCMS 110 may combine information regarding available digital content (e.g., stored within VCMS 110) and catalog integration information received via catalog integration API 340 into a single unified catalog file. VCMS 110 may provide the unified catalog file to data center 120 using VCMS catalog API 370.

Data center 120 may provide billing processing information to billing server 140 via billing processing API 380. Billing processing information may include, for example, identification of and/or charges associated with content ordered by users of user devices 170. Billing processing API 380 may be used to support customer billing processes (e.g., for digital content) and fulfill payment transactions (e.g., for physical content).

Registration pass-through API 390 may provide a communication interface for data center 120 to exchange user registration and authentication information with profile server 130. Registration information may include, for example, user information (e.g., name, address, device identifiers, etc.) required to create an account for a user of user device 170. Authentication information may include, for example, information (e.g., a login name and password) to access a user's existing account. Data center 120 may pass registration/authentication information received from user device 170 to profile server 130, and profile server 130 may return validations to data center 120, via registration pass-through API 390.

Customer support API 395 may provide a communication interface to exchange information to resolve customer disputes. For example, customer support API may enable customer support system 160 to submit dispute information to and retrieve account information from physical asset distribution system 150.

Although FIG. 3 shows exemplary interfaces between components of network portion 300, in other implementations, network portion 300 may include fewer interfaces, different interfaces, differently arranged interfaces, or additional interfaces than those depicted in FIG. 3. Alternatively, or additionally, one or more interfaces of network portion 300 may perform one or more other tasks described as being performed by one or more other interfaces of network portion 300.

Figure 4:
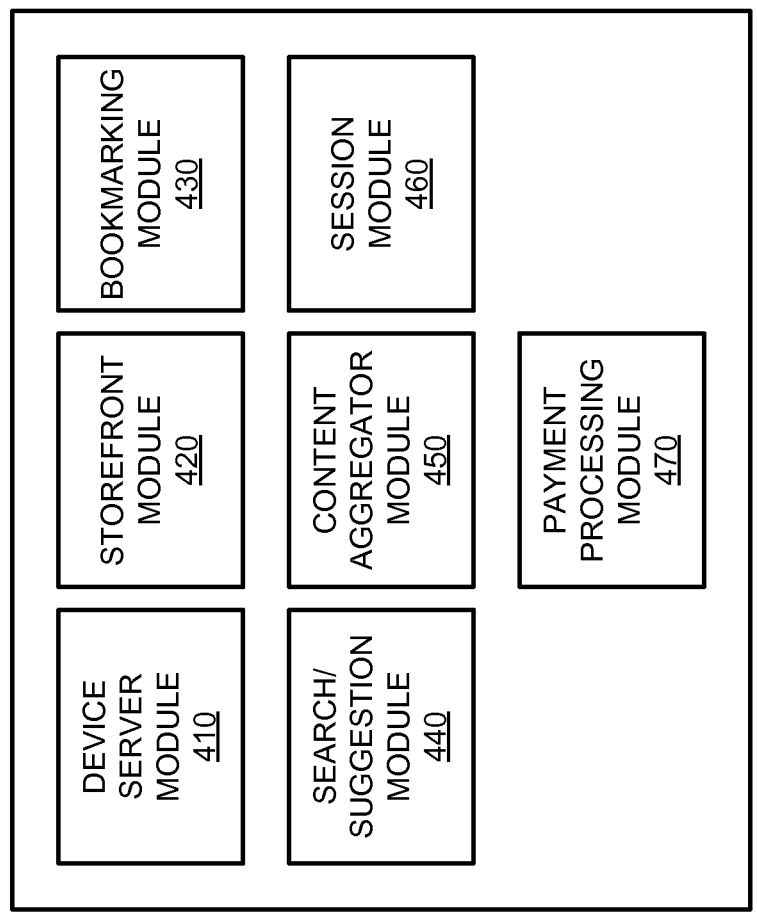
FIG. 4 is a diagram of exemplary functional components of an application server of FIG. 1.

FIG. 4 is a diagram of exemplary functional components of application server 124. In one implementation, the functions described in connection with FIG. 4 may be performed by one or more components of device 200 (FIG. 2). As shown in FIG. 4, application server 124 may include a device server module 410, a storefront module 420, a bookmarking module 430, a search/suggestion module 440, a content aggregator module 450, a session module 460, and a payment processing module 470.

Device server module 410 supports interactions between user devices 170 and backend servers, including (but not limited to) catalog server 122, content delivery system 112, and DRM server 114. Device server module 410 may determine which content format to use according the device type or platform. Device server module 410 may also aggregate content from different servers according to a user devices 170 request. In one implementation, device server module 410 may also temporarily cache some content locally for performance purposes.

Storefront module 420 provides a user interface to enable users to review and select content in a variety of formats, including digital content and physical content. Storefront module 420 may support browsing and searching of the catalog (e.g., a unified catalog compiled by catalog server 122) from user devices 170. Storefront module 420 may also provide an electronic shopping cart, transaction management, and/or promotions and advertisements.

Bookmarking module 430 tracks user viewing position (e.g., within particular digital content) and allows users of user devices 170 to view the content from the most recently viewed position. In one implementation the most recently viewed portion may be based on the viewing from the same user device 170. In another implementation the most recently viewed portion may be based on the user account (e.g., regardless of the particular user device 170). For example, when a user starts to view a video, bookmarking module 430 may ask a user where to start the presentation (e.g., at the beginning or from where it was stopped during the previous viewing).

Search/suggestion module 440 provides a user interface to enable a user to search the catalog by keywords. Search/suggestion module 440 may recommend particular content to the user based on the user's search terms, profile, viewing history, or previously purchased content. Search/suggestion module 440 can also recommend physical assets based on the digital viewing history or personal preferences.

Content aggregator module 450 aggregates information from Internet searching and social networks related to particular content (e.g., a program or video) for a user to view and share. In one implementation, content aggregator module 450 may provide links or other menu options to enable a user to select related content provided by content aggregator module 450.

Session module 460 receives user login information and forwards the user login information to profile server 130 for validation. For example, session module may collect user login information from user device 170 and forward the login information to profile server 130. Assuming the user is authenticated (e.g., by profile server 130 or physical asset distribution system 150), session module 460 may receive a session token and send the session token to user device 170.

Payment processing module 470 may include an interface with billing server 140 to bill the customer for the transaction of a purchase, a rental or a subscription. In one implementation, payment processing module 470 may also include a credit exchange interface with physical asset distribution system 150. For example, when a user purchases some digital content, coupon credits for getting physical media (e.g., DVDs or Blu-ray discs), may be deposited to a user's account associated with physical asset distribution system 150.

Figure 5:
FIG. 5 is a diagram of exemplary functional components of a catalog server of FIG. 1.

FIG. 5 is a diagram of exemplary functional components of catalog server 122. In one implementation, the functions described in connection with FIG. 5 may be performed by one or more components of device 200 (FIG. 2). As shown in FIG. 5, catalog server 122 may include a unified catalog 510, an entitlement database 520, and a device management module 530.

Unified catalog 510 includes the unified catalog of both digital content and physical content available for all users to buy, rent or subscribe. In one implementation, unified catalog 510 may be received from VCMS 110 and updated at periodic intervals.

Entitlement database 520 includes entitlement profiles for particular users. An entitlement profile may associate particular user devices 170 or platforms with particular types of content. In one implementation, profiles in entitlement database 520 may be added/deleted/changed by a user via interactions with application server 124.

Device management module 530 associates unified catalog 510 with a user's entitlement profile in entitlement database 520 to enforce what content the user can view on which device. For example, if a user bought a particular movie, the user may be able to view the movie on only certain user devices 170 (e.g., a television, a personal computer, and/or or registered mobile devices). Entitlement database 520 has entitlement rules associated with a user's profile. In one implementation, device management module 530 may verify entitlement before a DRM license can be issued to the user device 170.

Figure 6:
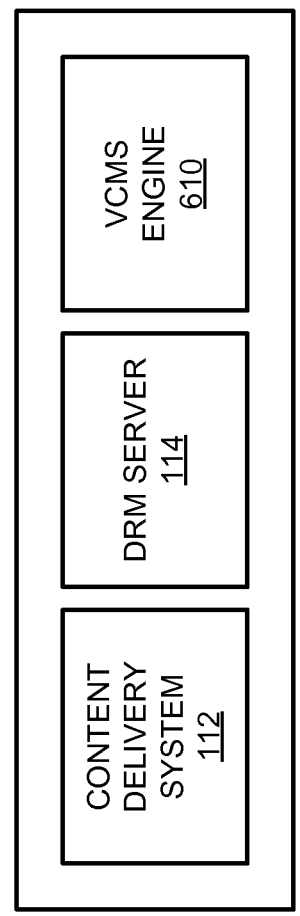
FIG. 6 is a diagram of exemplary functional components of a video content management system (VCMS) of FIG. 1.

FIG. 6 is a diagram of exemplary functional components of VCMS 110. In one implementation, the functions described in connection with FIG. 6 may be performed by one or more components of device 200 (FIG. 2). As shown in FIG. 6, VCMS 110 may include content delivery system 112, DRM server 114, and VCMS engine 610. Content delivery system 112 and DRM server 114 are described above in connection with, for example, FIGS. 1-5.

VCMS engine 610 receives catalog item descriptors and/or metadata (e.g., for physical assets) from physical asset distribution system 150. VCMS engine 610 may also receive catalog metadata for digital content from other content providers (not shown). VCMS engine 610 may compile catalog metadata from physical asset distribution system 150 and from digital content providers and provide a unified catalog file (e.g., via VCMS catalog API 370) to catalog server 122. VCMS 110 may also receive links to Internet content (e.g., for reviews and social media related to particular content). The Internet content links may be included, for example, in the metadata for the digital content/physical assets or provided as a separate file to be combined with the other metadata in the unified catalog file. In one implementation, the unified catalog file may be provided as an XML file and on a daily basis.

VCMS engine 610 may also receive and encrypt digital content (e.g., corresponding to catalog metadata) for secure distribution to user devices 170. In some instances, encryption may require an encryption key (e.g., key ID), which VCMS engine 610 may retrieve from DRM server 124. After encryption, VCMS engine 610 may provide the encrypted content to content delivery system 112.

In one implementation, VCMS engine 610 may also generate a settlement file that may be used to help billing server 140 determine settlement cost with content sources. For example, VCMS engine 610 may generate a monthly statement summarizing and/or itemizing downloads or streaming events by content source.

DRM server 114 may provide a DRM license to user device 170 for particular requested content (e.g., content selected from catalog server 122 and authorized by application server 124). DRM server 114 may connect to catalog server 122 (e.g., device management module 530) to verify that a requesting user device 170 is entitled to receive the requested content before issuing the DRM license. Content delivery system 112 may receive encrypted content from VCMS engine 610 and, separate from the license provided by DRM server 114, may provide the encrypted content to requesting user devices 170.

Figure 7:
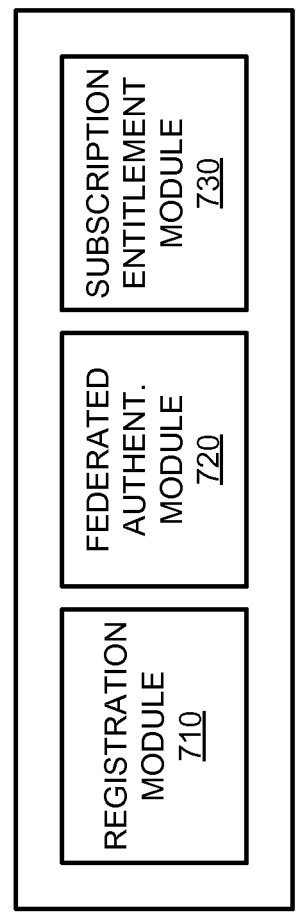
FIG. 7 is a diagram of exemplary functional components of a profile server of FIG. 1.

FIG. 7 is a diagram of exemplary functional components of profile server 130. In one implementation, the functions described in connection with FIG. 7 may be performed by one or more components of device 200 (FIG. 2). As shown in FIG. 7, profile server 130 may include a registration module 710, a federated authentication module 720, and a subscription entitlement module 730.

Registration module 710 allows a user to register if the user is not registered in the multi-screen video system of network 100. For example, registration module 710 may allow a new user to associate a new user name and password upon providing appropriate credentials.

Federated authentication module 720 authenticates a user and issues a session token. A session is federated on different user authentication systems (e.g., associated with a digital content provider or physical asset distribution system 150) based on a user's master profile location. The master profile may be maintained, for example, by a source for a user account, based on the type of media requested by user device 170. For example, federated authentication module 720 may connect to an authentication server in physical asset distribution system 150 if the user profile is in a database associated with physical asset distribution system 150; or federated authentication module 720 may connect to a wireless carrier's authentication services if the user is a wireless carrier consumer. The authentication can be completed through a proprietary authentication agent or a standard gateway such Open ID.

Subscription entitlement module 730 monitors a user's payment history or other account indications to verify that an account is current before authenticating a user. For example, subscription entitlement module 730 may return to application server 124, along with an authentication, a list of entitlement based on a user's payment history. The entitlement information for a user may be synchronized with entitlement database 520 in catalog server 122 so that the entitlement restrictions can be enforced when user device 170 submits a request to play a video.

Figure 8:
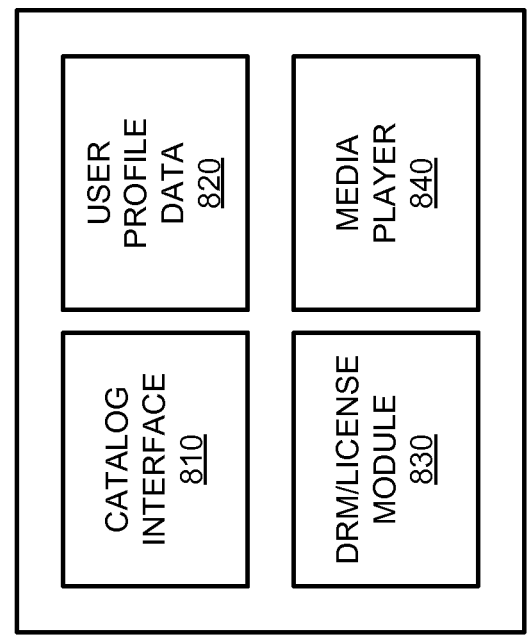
FIG. 8 is a diagram of exemplary functional components of a user device of FIG. 1.

FIG. 8 is a diagram of exemplary functional components of user device 170. In one implementation, the functions described in connection with FIG. 8 may be performed by one or more components of device 200 (FIG. 2). As shown in FIG. 8, user device 170 may include a catalog interface 810, a user profile data 820, a DRM/license 830, and a media player 840.

Catalog interface 810 may include an interactive client interface that allows a user to request a list of available content (e.g., both digital and physical content) and select from the list of available content. Catalog interface 810 may also include an account login interface. For example, catalog client 810 may request, from data center 120, a list of content available for downloading and may present the list of content to a user of user device 170. Catalog interface 810 may include an interactive client interface that allows a user provide inputs, such as user passwords, preferences, and selections from the list of available content. In one implementation, catalog interface may indicate a user's selection (e.g., from the catalog) to data center 120 and, in return, receive session-specific information to obtain the selected content.

User profile data 820 may include stored user information input by a user (e.g., a user login name/password) and session-specific information obtained from data center 120. Session-specific information may include, for example, cookies, URLs, or other information to enable user device 170 to access content delivery system 112 and DRM server 114.

DRM/license module 830 may initiate a connection with DRM server 114 to obtain one or more secure key(s), such as a decryption key that permits user device 170 to decrypt video content selected by a user. For example, DRM/license module 830 may communicate with catalog interface 810 to identify selected content and coordinate the receipt of DRM security information (e.g., from DRM server 124) with protected content from content delivery system 112. Protected content may include, for example, any content encrypted to enforce copyright restrictions.

Media player 840 may initiate a connection with content delivery system 112 to retrieve the content selected by the user and decrypt protected content based on information from DRM/license module 830.

Figure 9:
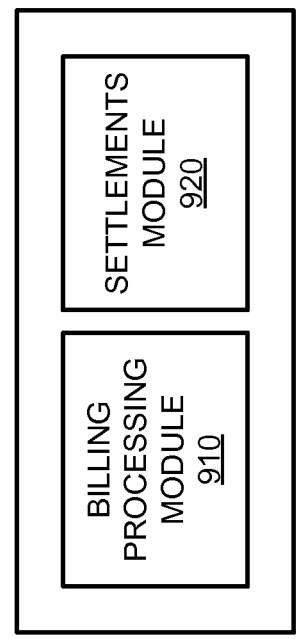
FIG. 9 is a diagram of exemplary functional components of a billing server of FIG. 1.

FIG. 9 is a diagram of exemplary functional components of billing server 140. In one implementation, the functions described in connection with FIG. 9 may be performed by one or more components of device 200 (FIG. 2). As shown in FIG. 9, billing server 140 may include a billing processing module 910 and a settlements module 920.

Billing processing module 910 performs processing to charge a user's account after the user buys, rents, or subscribes to content listed in the video catalog. Billing processing module 910 may receive (e.g., from data center 120) a purchase or rental payment request and initiate a payment transaction via a payment gateway (e.g., credit card processing). Billing processing module 910 may simply bill subscriptions to a user's account automatically each month (or at another interval). Billing processing module 910 may synchronize the billing results with profile server 130 (e.g., subscription entitlement module 730) to enforce entitlement restrictions and may generate a report (e.g., either periodically for a group or transactions or for individual transactions) related to physical assets. In one implementation, billing processing module 910 may also include an interface with customer support system 160 to permit credit adjustments and/or cancellations related to charge disputes.

Settlements module 920 includes features to provide cost assurance and revenue assurance. Cost assurance assures that partners (such as a studio or another content source) are paid according to a previously agreed contract. Contract information (e.g., for content sources) may be provided from a contract management source (not shown). Revenue assurance ensures that users have paid a bill according to the user's purchase, rental, or subscription agreement. In one implementation, settlements module 920 may receive a settlement file from VCMS 110 (e.g., VCMS engine 610) that identifies content provider settlements (e.g., how much revenue to share with particular studios) based on actual usage statistics. Settlements module 920 may also include an interface with individual content providers (not shown) to provide revenue accounting.

Figure 10:
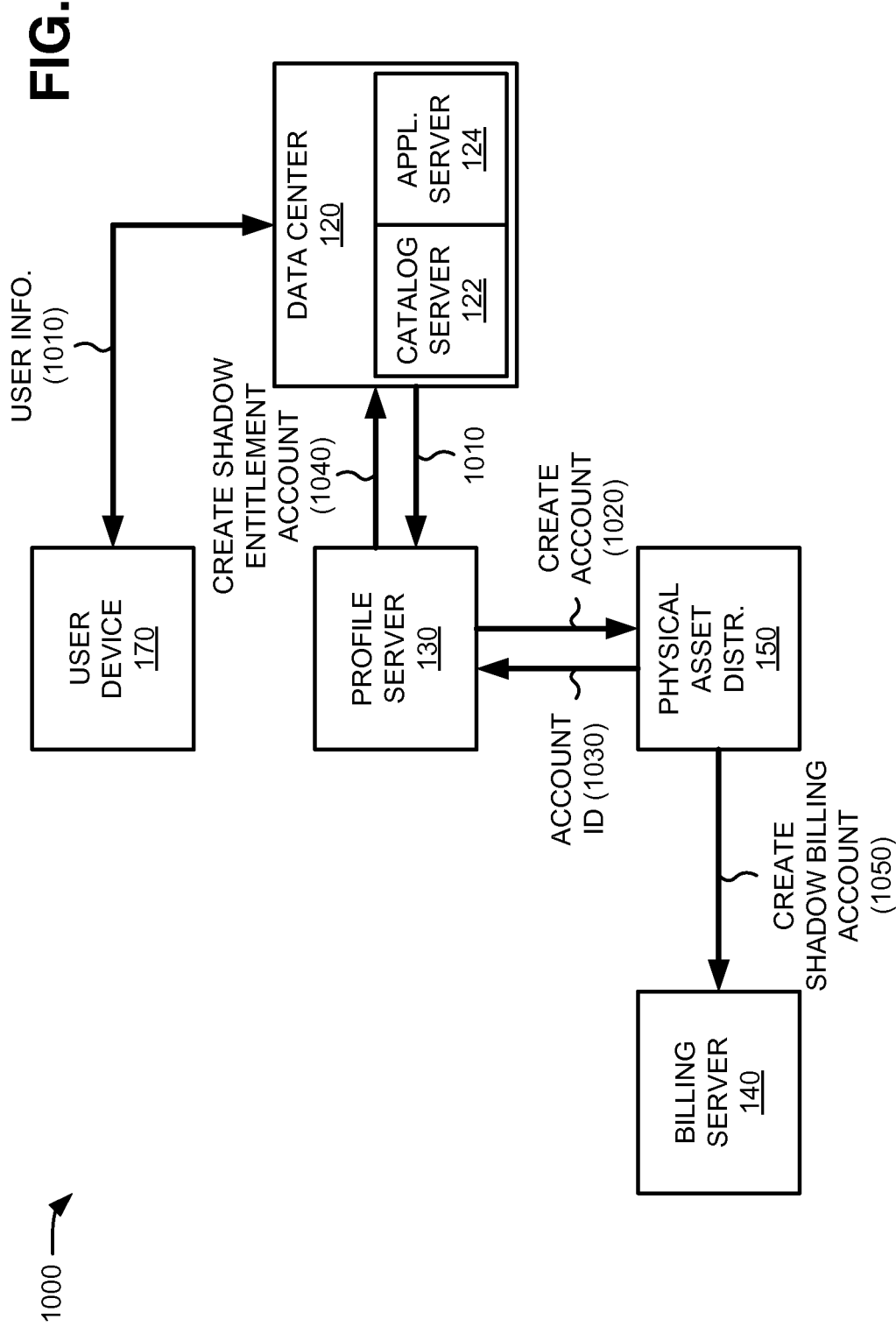
FIG. 10 is a diagram of exemplary communications for a portion of network 100.

FIG. 10 is a diagram of exemplary communications for a portion 1000 of network 100. Communications in FIG. 10 may represent communications for a registration process. As shown in FIG. 10, network portion 1000 may include data center 120, profile server 130, billing server 140, physical asset distribution system 150, and user device 170.

As shown in FIG. 10, user device 170 may connect to data center 120 to pass user information 1010 to data center 120 (e.g., application server 124). User information 1010 may include registration information, such as name, physical address, electronic address, device information, etc. Data center 120 may delegate the registration task by passing user information 1010 to profile server 130. Profile server 130 may receive user information 1010 and may communicate with physical asset distribution system 150 to create a user account based on user information 1010, as indicated by reference number 1020. The user account may be included, for example, in a master-profile database associated with physical asset distribution system 150 (e.g., billing processing module 910).

Physical asset distribution system 150 confirms a successful account creation and returns an account identifier 1030 (e.g., a unique alpha-numeric string) to profile server 130. In response to receiving account identifier 1030, profile server 130 may signal data center 120 (e.g., catalog server 122) to create a shadow entitlement account 1040 with an entitlement profile (e.g., in entitlement database 520) for the new user. Additionally, profile server 130 may signal billing server 140 to create a shadow billing account (e.g., in entitlement database 520) for the new user.

Figure 11:
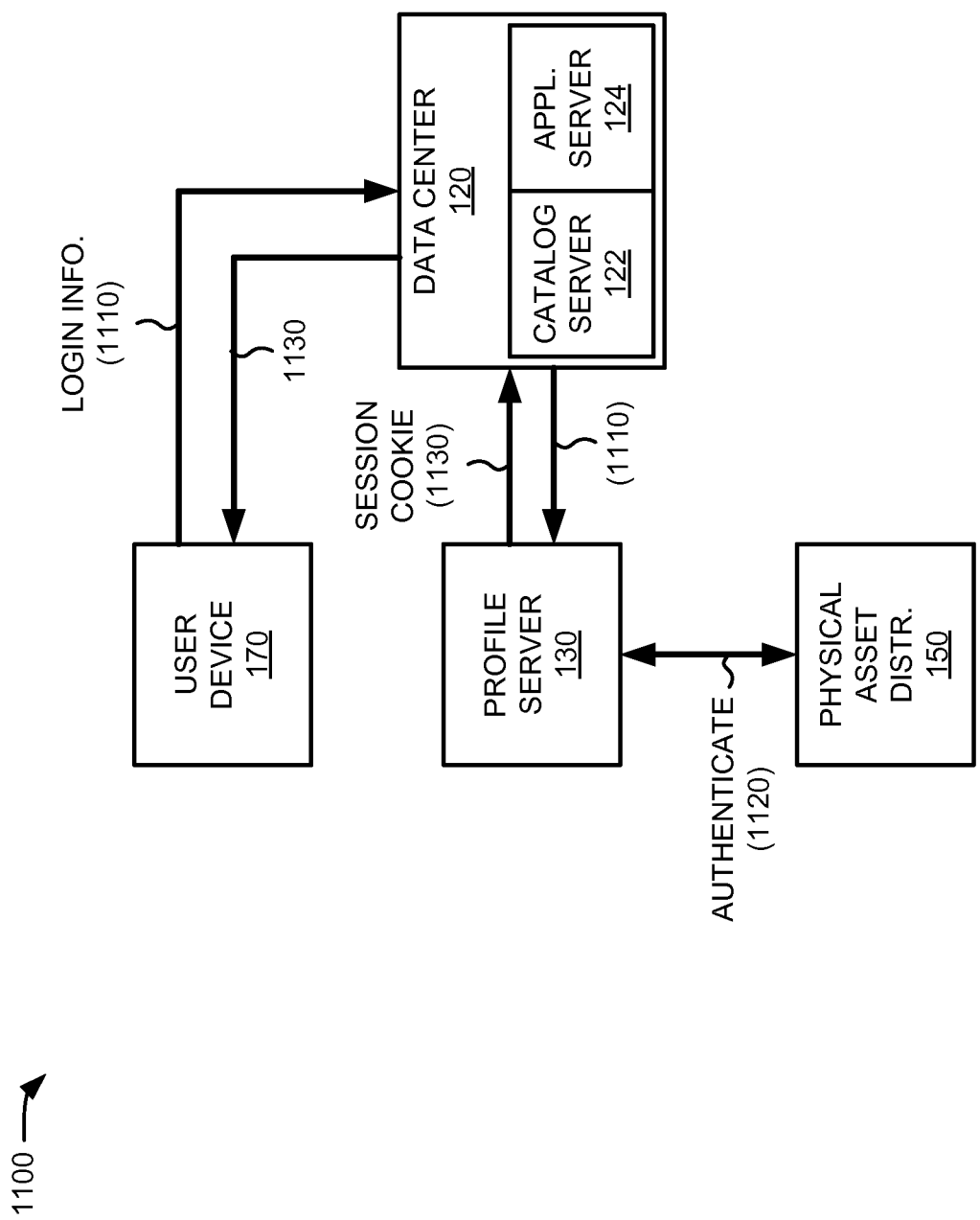
FIG. 11 is a diagram of exemplary communications for another portion of network 100.

FIG. 11 is a diagram of exemplary communications for a portion 1100 of network 100. Communications in FIG. 11 may represent communications for a login process. As shown in FIG. 11, network portion 1100 may include data center 120, profile server 130, physical asset distribution system 150, and user device 170.

As shown in FIG. 11, user device 170 may connect to data center 120 to pass login information 1110 to data center 120 (e.g., application server 124). Login information 1110 may include, for example, a user name and password associated with a user account. Data center 120 may receive login information 1110 and may delegate the login authentication task by passing login information 1110 to profile server 130. Profile server 130 may receive login information 1110 and may communicate with physical asset distribution system 150 to authenticate the user through the master-source database residing on physical asset distribution system 150, as indicated by reference number 1120. Once the user is authenticated, profile server 130 may generate a session token 1130 that includes an expiration time. The session token may include, for example, a hash value of the user name, expiration time, and a secret string. In one implementation, session token can be saved in data center 120 (e.g., application server 124) for future validation.

Figure 12:
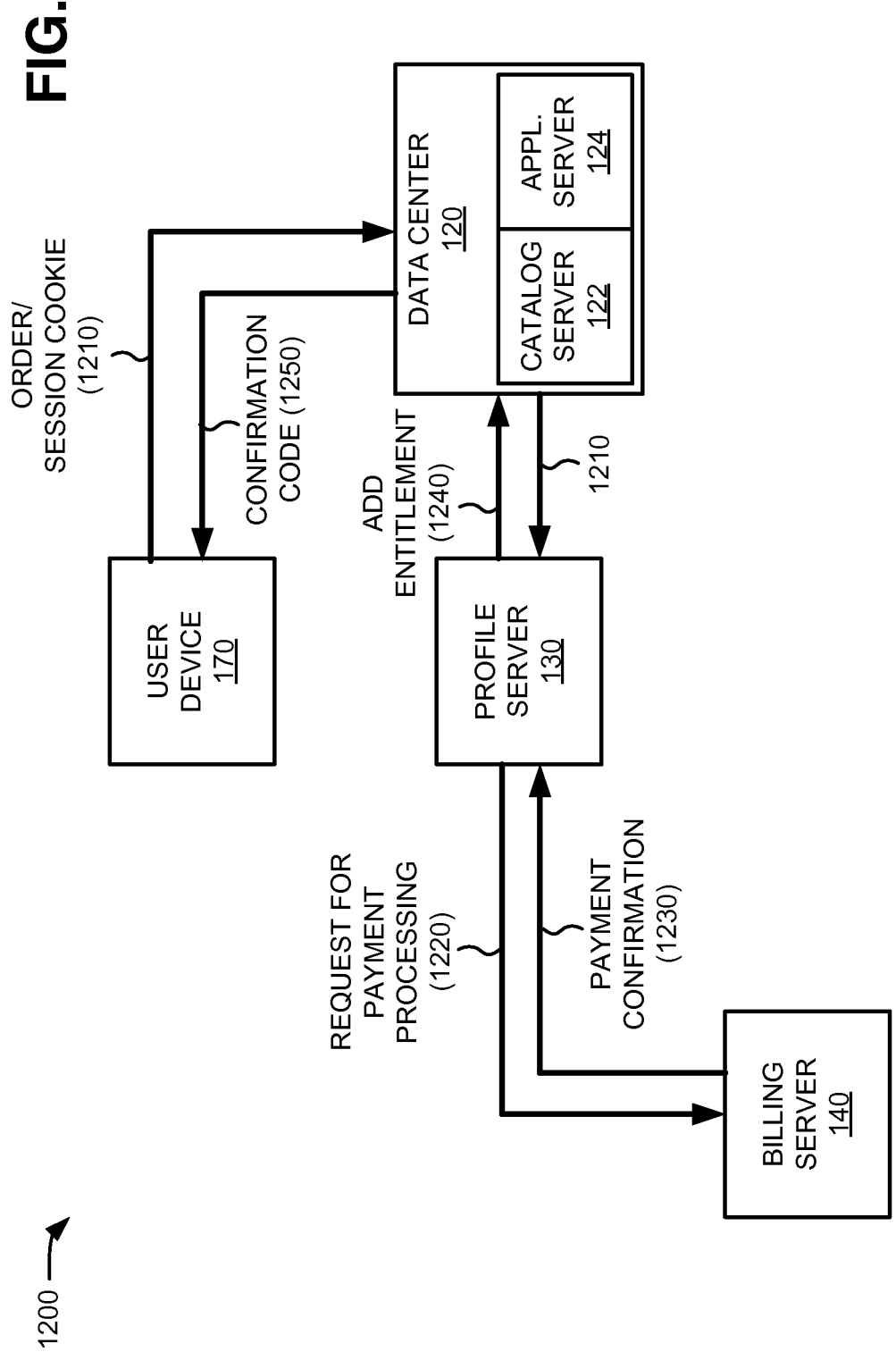
FIG. 12 is a diagram of exemplary communications for still another portion of network 100.

FIG. 12 is a diagram of exemplary communications for a portion 1200 of network 100. Communications in FIG. 12 may represent communications for a digital content purchase process. As shown in FIG. 12, network portion 1200 may include data center 120, profile server 130, billing server 140, and user device 170.

In FIG. 12, a user (e.g., of user device 170) may select a video to purchase/rent using an interactive catalog previously provided to user device 170. In response to the user selection, user device 170 may connect to data center 120 to pass an order request and session cookie (e.g., session cookie 1130 of FIG. 11) to data center 120 (e.g., application server 124), as indicated by reference number 1210. If the session cookie is expired, data center 120 can ask the user to input login information again (unless the login information was already saved on user device 170).

Data center 120 may receive the order and session cookie 1210, accept the session cookie (if valid), and delegate the purchase request by passing the order to profile server 130. Profile server 130 may receive the order and may communicate with billing server 140 to request payment processing, as indicated by reference number 1220. Billing server may perform payment processing (e.g., by initiating a credit card transaction). After a successful payment, billing server 140 may provide a payment confirmation 1230. In response to payment confirmation 1230, profile server 130 may update the user's entitlement account. The new entitlement 1240 may be sent to data center 120 (e.g., catalog server 122) to reflect the purchase, rental or subscription ordered by the user. In one implementation, profile server 130 may also deposit coupon credits (e.g., for ordering physical media, such as DVD or Blu-ray discs) to the user's account. Upon receiving entitlement 1240, data center 120 (e.g., application server 124) may return a purchase success indication and confirmation code 1250 to user device 170.

FIG. 13 is a diagram of exemplary communications for a portion 1300 of network 100. Communications in FIG. 13 may represent communications for a playing purchased digital content. As shown in FIG. 13, network portion 1300 may include VCMS 110, data center 120, and user device 170.

As shown in FIG. 13, a user may choose a particular video from the library of content on user device 170. Based on the user's selection, user device 170 may connect to data center 120 to pass a request and session cookie to data center 120 (e.g., application server 124), as indicated by reference number 1310. If the session cookie is expired, data center 120 can ask the user to input login information again (unless the login information was already saved on user device 170).

Data center 120 (e.g., application server 124) may receive the request and session cookie 1310, accept the session cookie (if valid), and verify the entitlement for the requested video (e.g. by checking with device management module 530 of catalog server 122). If the user/user device 170 is entitled, data center 120 may return a streaming URL 1320 to user device 170. Streaming URL 1320 may include a URL for VCMS 120 (e.g., content delivery system 112) from which user device 170 may retrieve the particular streaming content requested by the user.

Upon receiving streaming URL 1320, user device 170 may access the streaming URL to request the particular content, as indicated by reference number 1330. In response, VCMS 120 (e.g., content delivery system 112) may begin streaming the requested content, including a content header. A content header can include information where to fetch the DRM license to permit a user to display the content. Based on the content header, user device 170 may submit a license request 1340 to VCMS 120 (e.g., DRM server 114) to retrieve the DRM license.

VCMS 120 (e.g., DRM server 114) may receive license request 1340 and may communicate with data center 120 (e.g., catalog server 122) to validate the entitlement for the requested content, as indicated by reference number 1350. If the validation is successful, VCMS 120 (e.g., DRM server 114) may return the DRM license 1360 to user device 170. A DRM agent (e.g., DRM/license module 830) on user device 170 may validates DRM license 1350 for user device 170 and user device 170 may play the streaming video if user device 170 is validated.

FIG. 14 is a flow chart of an exemplary process 1400 for providing access to multi-screen video and physical asset orders according to an implementation described herein. Process 1400 may be performed by one or more components of network 100.

As shown in FIG. 14, process 1400 may include receiving catalog metadata of physical assets (block 1405), receiving catalog metadata for physical content (block 1410), and receiving links to Internet content (block 1415). For example, as described above in connection with FIG. 3, VCMS 110 may receive catalog metadata of physical assets from physical asset distribution system 150 via catalog integration API 340. VCMS 110 may also receive metadata and/or Internet content links (e.g., for reviews and social media related to particular content) for digital content available for on-line distribution. In one implementation, the catalog information regarding available digital content and/or the catalog integration information may include links to Internet content. In another implementation, the links to Internet content may be provided separately from the catalog information regarding available digital content and the catalog integration information.

Process 1400 may also include combining the catalog metadata of the physical assets, the catalog metadata for the digital content, and the links to Internet content into a unified catalog file (block 1420), and sending the unified catalog file to a user device (block 1425). For example, VCMS 110 may combine catalog information regarding available digital content and catalog integration information received via catalog integration API 340 (and any Internet content linkage) into a single unified catalog file. VCMS 110 may provide the unified catalog file to data center 120 using VCMS catalog API 370. Data center 120 may provide the unified catalog file to user device 170 in response to a request from user device 170.

Process 1400 may include receiving, from the user device, a selection of an item from the unified catalog (block 1430), and determining a format of the selected item (block 1435). For example, user device 170 may provide a selection to data center 120 via application server API 310. Data center 120 may identify the requested file as one of digital content (e.g., that can be provided directly to user device 170) or a physical asset (e.g., that can be retrieved by, or physically delivered to, a user).

If the format of the selected item is digital content (block 1435—"digital content"), process 1400 may include processing billing for a local account associated with the user (block 1440) and providing, to the user device, video content corresponding to the selection (block 1445). For example, data center 120 may forward the user's selection to profile server 130 which may, in turn provide a request for payment processing to billing server 140. Assuming successful payment transaction, user device 170 may receive a confirmation code and a streaming URL to access the selected content, as described above in connection with FIGS. 12 and 13.

If the format of the selected item is a physical asset (block 1435—"physical asset"), process 1400 may include providing, to a third-party system, user payment information for the physical asset (block 1450). For example, profile server 130 may forward user payment information to physical asset distribution system 150 to process the request for the requested physical asset and, for example, reserve the item for pick-up by the user.

Systems and/or methods described herein may provide a component-based architecture, for video services, that allows third-party components to be easily integrated. The systems and/or methods provide for user selection of multiple types of video formats, including digital content and physical assets. The systems and/or methods also enable billing integration for video orders.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 14, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method implemented by one or more computing devices, the method comprising:
    receiving, from a third-party physical asset distribution system, catalog metadata for physical media assets available to order;
    combining the catalog metadata with catalog entries for digital content to form a unified catalog file;
    receiving, from a user device associated with a user, login information for the user;
    providing, via an application programming interface (API), the login information to the third-party physical asset distribution system for authentication;
    generating a session token, when the user is authenticated using the login information;
    sending, to the user device, the session token;
    receiving, from the user device, a request to view a directory of available video content;
    sending, to the user device, the unified catalog file for presentation to the user;
    receiving, from the user device, a selection indicating a particular item in the unified catalog file and the session token;
    identifying, from the selection, a format of the particular item as corresponding to one of digital content or a physical media asset;
    providing, to the user device and based on the identifying the format of the particular item, video content corresponding to the particular item when the format of the particular item corresponds to the digital content;
    providing, to the third-party physical asset distribution system via a billing gateway and based on the identifying the format of the particular item, user payment information when the format of the particular item corresponds to the physical media asset; and
    receiving, from the third-party physical asset distribution system, one or more identities of locations for obtaining one of the physical media assets after providing the user payment information.

2. The method of claim 1, further comprising:
    storing, in a memory, an entitlement profile for a user, wherein the entitlement profile indicates associations of particular presentation platforms with particular types of content; and
    associating items in the unified catalog file with the entitlement profile to enforce via which presentation platforms, of a group of presentation platforms, the user can view particular content, wherein the group of presentation platforms indicate in the entitlement profile includes a television, a personal computer, and a registered mobile device.

3. The method of claim 1, further comprising:
    providing, to the third-party physical asset distribution system, a coupon credit for the user when the selection corresponds to the digital content; or
    crediting an account for the user to receive the digital content when the format of the particular item corresponds to the physical media asset.

4. The method of claim 1, further comprising:
    verifying entitlement of the user device to receive the video content corresponding to the particular item, when the format of the particular item corresponds to the digital content; and
    providing, after the entitlement of the user device is verified, a digital rights management license to the user device for the video content corresponding to the particular item.

5. The method of claim 1, further comprising:
    storing digital content corresponding to the catalog entries for the digital content, wherein providing video content corresponding to the particular item includes providing to the user device a universal resource locator (URL) for the user device to obtain the video content corresponding to the format of the particular item.

6. The method of claim 1, further comprising:
    sending, to a billing system, billing processing information for the video content corresponding to the particular item when the format of the particular item corresponds to the digital content.

7. The method of claim 1, wherein combining the catalog metadata with catalog entries for digital content to form a unified catalog file further comprises:
    identifying links to additional Internet content associated with the catalog entries for the digital content, and
    combining the links to the additional Internet content in the unified catalog file.

8. The method of claim 7, wherein the links to the additional Internet content include one or more links to user reviews of the digital content and social network information related to the digital content.

9. A system, comprising:
    a video content management system (VCMS) including one or more network devices configured to:
        receive catalog metadata for digital content,
        receive catalog descriptions for physical media assets available to order from a third-party physical asset distribution system, and
        provide a unified catalog file, based on the catalog metadata for the digital content and the catalog descriptions for physical media assets, to a data center;
    a profile component including one or more network devices configured to:

receive, from user devices associated with users, login information for the users, provide via an application programming interface (API), the login information to the third-party physical asset distribution system for authentication, generate session tokens, when the users are authenticated using the login information, and send, to the user devices, the session tokens;

the data center including one or more network devices configured to:

receive the catalog metadata and the catalog descriptions from the VCMS, receive requests from the user devices, associated with the users, to view a catalog of available video content, provide the catalog metadata for the digital content and the catalog descriptions for physical media assets to the user devices, in response to the requests, for presentation to the users in a unified file, receive, from the user devices, the session tokens and selections indicating particular items from the catalog metadata for the digital content and the catalog descriptions for the physical media assets, and identify, from the selections, a format of each of the particular items as corresponding to one of the digital content or the physical media asset; and a billing system including one or more network devices configured to:

receive, from the data center, indications of the selections from the catalog metadata for the digital content and the catalog descriptions for the physical media assets, process payment or billing for an account associated with one of the user devices when one of the indications is of the catalog metadata, and forward, to the third-party physical asset distribution system and via a billing gateway, user payment information when one of the indications of the selections is from the catalog descriptions for the physical media assets, wherein the data center is further includes one or more network devices configured to receive, from the third-party physical asset distribution system, one or more identities of locations for obtaining one of the physical media assets after forwarding the user payment information.

10. The system of claim 9, wherein the VCMS further includes one or more network devices configured to:

store the digital content for distribution to the user devices, and distribute the digital content to the user devices based on receiving a request from one of the user devices.

11. The system of claim 9, wherein the VCMS and the billing system are configured to communicate with the third-party physical asset distribution system via a set of standardized application program interfaces (APIs).

12. The system of claim 9, wherein the user devices include one of a television, a personal computer, and a registered mobile device.

13. The system of claim 9, wherein the data center further includes one or more network devices configured to:

request the third-party physical asset distribution system to assign a billing credit for one of the users when one of the indications is of the catalog metadata for the digital content; or assign a credit to an account for the one of the users to receive the digital content when one of the indications is of the catalog descriptions for the physical media assets.

14. The system of claim 9, wherein the profile component is further configured to authenticate the users with a wireless carrier.

15. The system of claim 9, wherein the data center further includes one or more network devices configured to:

send, to the user devices, the one or more identities of the locations associated with the selections from the catalog descriptions.

16. The system of claim 9, wherein the VCMS further includes one or more network devices configured to:

identify links to Internet content associated with the selections from the catalog metadata and the catalog descriptions, and combine the links to Internet content with the unified catalog file.

17. A system, comprising:

a catalog component to compile a unified catalog of digital video content and physical assets;

a profile component to:

receive, from a user device associated with a user, login information for the user, provide, via an application programming interface (API), the login information to a third-party physical asset distribution system for authentication, generate a session token, when the user is authenticated using the login information, and send, to the user device, the session token;

a data center component to:

provide the unified catalog to the user device, receive, from the user device, the session token and a selection of an item from the unified catalog, wherein the item is one of digital content or a physical asset, and determine a format in the selection as corresponding to one of digital content or a physical media asset; and a billing component to:

receive an indication of the selected item, process a payment received from the user for the selected item, when the indication of the selected item corresponds to the digital content, and forward, to the third-party physical asset distribution system, user payment information when one of the indication of the select item corresponds to the physical media asset, wherein the data center component further receives, from the third-party physical asset distribution system, one or more identities of locations for obtaining the physical media asset after forwarding the user payment information, and wherein each of the catalog component, the data center, the profile component, and the billing component includes a set of application programming interface (APIs) to communicate with the third-party physical asset distribution system for distributing the physical assets.

18. The system of claim 17, wherein the physical assets include:

digital video discs (DVDs),

Blu-ray discs, or memory cards.

19. The system of claim 17, further comprising a content distribution system to provide the selected item to the user device, via a network, when the selected item includes the digital content.

20. The system of claim 17, wherein the catalog component is further to:
- identify links to Internet content associated with items in the unified catalog of digital video content and physical assets, and
- combine the links to Internet content with the unified catalog.

* * * * *